US005109602A

United States Patent [19]

Fukuda et al.

[11] Patent Number: 5,109,602

[45] Date of Patent: May 5, 1992

[54] METHOD OF AND APPARATUS FOR INSERTING WIRED TERMINALS INTO CONNECTOR HOUSING

[75] Inventors: Michio Fukuda, Nishinomiya; Yoshinobu Ohta, Yokkaichi; Kenichi Taniguchi, Suzuka; Katuyuki Sasaki, Yokkaichi, all of Japan

[73] Assignee: Sumitomo Wiring Systems Ltd., Mie, Japan

[21] Appl. No.: 671,335

[22] Filed: Mar. 19, 1991

[30] Foreign Application Priority Data

Mar. 23, 1990 [JP] Japan .................................. 2-74300

[51] Int. Cl.[5] .......................... B23P 19/00; H01R 9/16

[52] U.S. Cl. ........................................ 29/845; 29/747; 29/748; 29/759; 29/753; 29/861

[58] Field of Search ................. 29/844, 845, 748, 753, 29/754, 33 M, 759, 857, 861

[56] References Cited

U.S. PATENT DOCUMENTS

| | | | |
|---|---|---|---|
| 2,755,760 | 7/1956 | Fermanian | 29/759 |
| 4,598,469 | 7/1986 | Weikel | 29/845 |
| 4,612,696 | 9/1986 | Talley | 29/564.4 |
| 4,692,974 | 9/1987 | Cross | 29/845 |
| 4,779,334 | 10/1988 | Boutcher, Jr. | 29/748 |

FOREIGN PATENT DOCUMENTS

| | | |
|---|---|---|
| 0348615 | 1/1990 | European Pat. Off. . |
| WO89/07850 | 8/1989 | PCT Int'l Appl. . |

*Primary Examiner*—P. W. Echols
*Attorney, Agent, or Firm*—Sughrue, Mion, Zinn, Macpeak & Seas

[57] ABSTRACT

A method of and an apparatus for inserting into a terminal cavity of a connector housing, a terminal of a wired terminal in which the terminal is connected with an electric wire, comprising: a terminal grip member for gripping the terminal, which includes a pair of guide arms openable and closable in a horizontal plane and a terminal press arm pivotable in a vertical plane; a wire grip member for gripping the electric wire, which includes a chuck retractably advanced along the guide arms between the guide arms, a first drive member for retractably advancing the chuck and a second drive member for opening and closing the chuck such that a state of grip of the terminal by the terminal grip member is cancelled and established by the chuck at a forward end and a rearward end of a stroke of the chuck, respectively; and a robot flange for supporting the terminal grip member and the wire grip member.

2 Claims, 7 Drawing Sheets

METHOD OF AND APPARATUS FOR INSERTING WIRED TERMINALS INTO CONNECTOR HOUSING

BACKGROUND OF THE INVENTION

The present invention relates to a method of and an apparatus for automatically inserting into a connector housing, terminals of wired terminals in which each of the terminals is connected with an electric wire.

An apparatus for automatically inserting terminals of wired terminals into a connector housing is known from, for example, Japanese Patent Laid-Open Publication Nos. 63-170874 and 63-164181. In this known apparatus, by gripping the electric wire of each wired terminal by a robot hand, the terminal is inserted, via an insertion guide, into each of terminal cavities for receiving the terminals, which are formed on the connector housing. This insertion guide facilitates insertion of the terminals into the terminal cavities.

However, in this known apparatus, a clamping position of the electric wire by the robot hand is required to be disposed considerably remote from the terminal such that interference between the robot hand and the insertion guide is prevented. Thus, since a distance between the clamping position of the electric wire by the robot hand and the terminal is increased, such an inconvenience may be incurred that the electric wire bends angularly at the clamping position at the time of insertion of the terminal into the terminal cavity. Especially, in the case where a guide hole of the insertion guide is formed by a tapered hole as disclosed in Japanese Patent Laid-Open Publication No. 63-170874, such a risk is further enhanced that the terminal is engaged with the surface of the tapered hole, thereby resulting in angular bending of the electric wire.

Another example of the apparatus is known from Japanese Patent Laid-Open Publication No. 60-119090. In this prior art apparatus, the terminal and the electric wire of each wired terminal are, respectively, clamped by a terminal chuck and a wire chuck such that the wired terminal is displaced forwards of the terminal cavities. Then, after a distal end of the terminal has been inserted into each of the terminal cavities, the wire chuck is retracted away from the electric wire and the terminal is inserted into each of the terminal cavities by the terminal chuck.

However, in this prior art apparatus, the terminal and the electric wire are, respectively, clamped by the terminal chuck and the wire chuck after the wired terminal has been transported to a predetermined location. Thus, in the case where the terminal is shifted from a predetermined position relative to the electric wire during transport of the wired terminal or linearity between the terminal and the electric wire is impaired in a contact bonding step preceding the transport, the terminal is clamped at a position away from the predetermined position by the terminal chuck. Hence, if the wired terminal is fed to the connector housing such that the terminal is inserted into the terminal cavity in this state, the terminal is not properly inserted into the terminal cavity. Meanwhile, in this prior art apparatus, the terminal chuck is required to be retracted away from the connector housing during insertion of the terminal into the terminal cavity such that interference between the terminal chuck and the connector housing is prevented. Therefore, insertion guide function of the terminal chuck for the terminal is cancelled during insertion of the terminal into the terminal cavity, thereby resulting in improper insertion of the terminal into the terminal cavity. Furthermore, since a period for retracting the terminal chuck away from the connector housing is required to be provided additionally a period required for performing the operation of inserting the terminal into the terminal cavity is increased.

SUMMARY OF THE INVENTION

Accordingly, an essential object of the present invention is to provide a method of and an apparatus for automatically inserting terminals of wired terminals into terminal cavities of a connector housing, respectively rapidly and accurately.

In order to accomplish this object of the present invention, there is provided in one aspect of the present invention, a method of inserting into a terminal cavity of a connector housing in a terminal inserting apparatus, a terminal of a wired terminal in which said terminal is connected with an electric wire, said terminal inserting apparatus comprising: a terminal grip means for gripping said terminal, which includes a pair of guide arms openable and closable in a horizontal plane and a terminal press arm pivotable in a vertical plane such that said guide arms and said terminal press arm are, respectively, pressed against opposite side faces and an upper face of said terminal; and a wire grip means for gripping said electric wire, which includes a chuck retractably advanced along said guide arms between said guide arms; the method comprising the steps of: fitting said electric wire of said wired terminal between said guide arms in a state where said wired terminal is positioned at a predetermined location and said chuck is opened at a front end of said guide arms; clamping a portion of said electric wire adjacent to said terminal by said chuck; retracting said chuck along said guide arms so as to clamp said terminal between said guide arms and said terminal press arm; displacing said wired terminal to a position located in front of said terminal cavity of said connector housing in a state where said wired terminal is clamped by said terminal grip means and said wire grip means; and forwardly displacing said chuck along said guide arms so as to insert said terminal into said terminal cavity of said connector housing by guiding said terminal by said guide arms and said terminal press arm.

Meanwhile, in another aspect of the present invention, an apparatus for inserting into a terminal cavity of a connector housing, a terminal of a wired terminal in which said terminal is connected with an electric wire, comprises: a terminal grip means for gripping said terminal, which includes a pair of guide arms openable and closable in a horizontal plane and a terminal press arm pivotable in a vertical plane such that said guide arms and said terminal press arm are, respectively, pressed against opposite side faces and an upper face of said terminal by elastic forces; a wire grip means for gripping said electric wire, which includes a chuck retractably advanced along said guide arms between said guide arms, a first drive member for retractably advancing said chuck and a second drive member for opening and closing said chuck such that a state of grip of said terminal by said terminal grip means is cancelled and established by said chuck at a forward end and a rearward end of a stroke of said chuck, respectively; and a robot flange for supporting said terminal grip means and said wire grip means.

In accordance with the present invention, since the wired terminal is clamped by drawing the terminal between a pair of the guide arms and the terminal press arm by the chuck, the wired terminal is accurately positioned at the predetermined location so as to be clamped.

Furthermore, since the terminal is thrusted, through guide of the terminal by the guide arms and the terminal press arm, towards the terminal cavity of the connector housing by the chuck so as to be inserted into the terminal cavity, the terminal is inserted into the terminal cavity highly accurately.

Moreover, since the chuck clamps a portion of the electric wire adjacent to the terminal, such a drawback is eliminated that the electric wire is bent angularly at the time of insertion of the terminal into the terminal cavity.

BRIEF DESCRIPTION OF THE DRAWINGS

This object and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
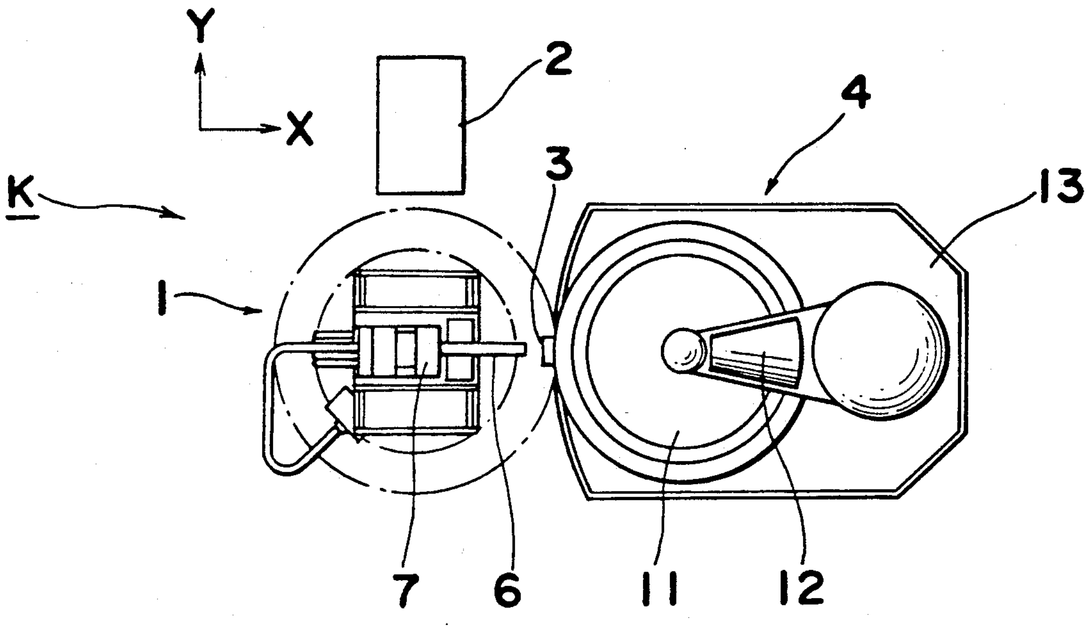
FIG. 1 is a top plan view of an apparatus for automatically inserting wired terminals into a connector housing, according to one embodiment of the present invention.
Figure 2:
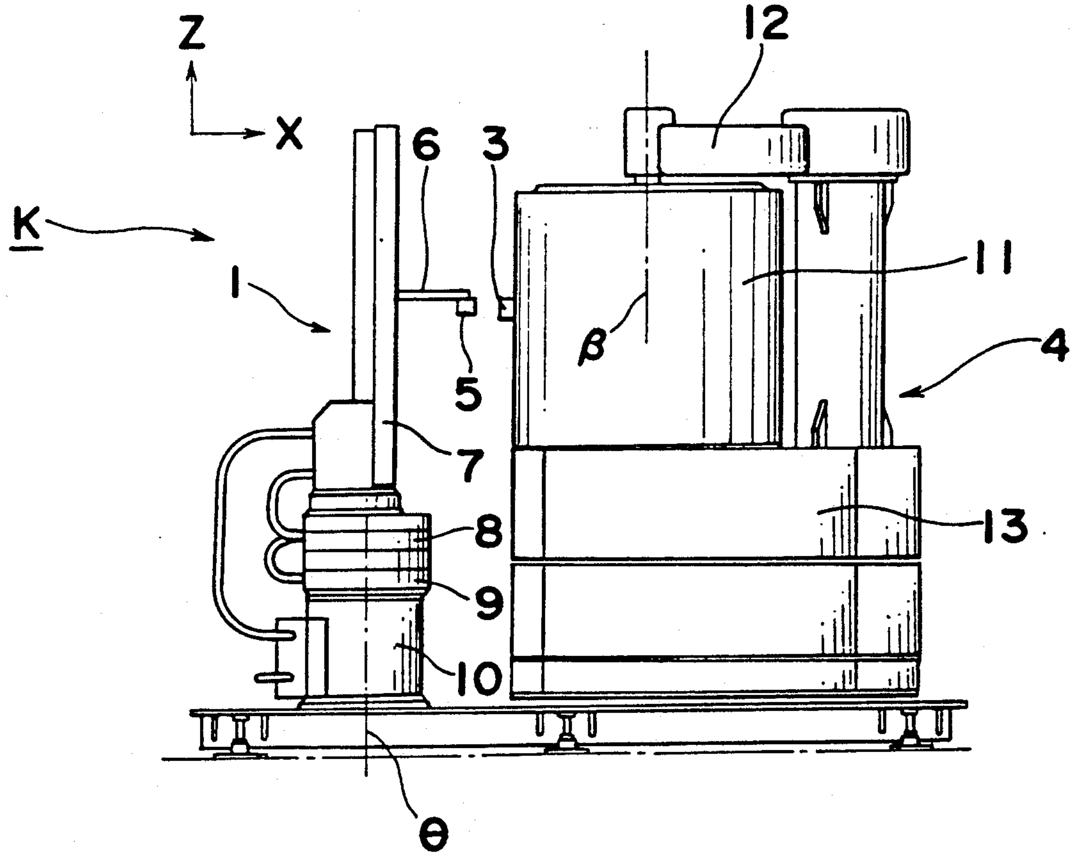
FIG. 2 is a side elevational view of the apparatus of FIG. 1.

Referring now to the drawings, there is shown in FIGS. 1 and 2, an apparatus K for automatically inserting into terminal cavities 3*a* (FIG. 15) of a connector housing 3, terminals of wired terminals in each of which each of the terminals is connected with an electric wire. As shown in FIGS. 1 and 2, the apparatus K includes a robot 1 for inserting the wired terminals into the connector housing 3, a terminal positioning device 2 for positioning each of the terminals and a housing setter 4 for setting the connector housing 3 at a predetermined position. The terminal positioning device 2 is provided at one side of the robot 1, while the housing setter 4 is provided in front of the robot 1.

The terminal positioning device 2 has a function of positioning and holding each of the terminals of the wired terminals prepared in the preceding process, by adjusting strokes of the terminals in accordance with kinds of the terminals and is mainly constituted by a wire clamp for gripping the electric wire and a guide for correcting feed of the terminal as will be described in detail later.

The robot 1 has a robot flange 6 to a distal end of which a manipulator 5 is attached. The robot 1 includes a Z-axis stroke adjusting mechanism 7 for displacing the robot flange 6 in the direction of the Z-axis, i.e. in the vertical direction, an X-axis stroke adjusting mechanism 8 for displacing the robot flange 6 in the direction of the X-axis, i.e. in the longitudinal direction, a Y-axis stroke adjusting mechanism 9 for displacing the robot flange 6 in the direction of the Y-axis, i.e. in the lateral direction and a $\theta$-axis rotational adjusting mechanism 10 for rotating the robot flange 6 about the $\theta$-axis. Thus, linear movements of the manipulator 5 in the three dimensional directions are controlled by the Z-axis stroke adjusting mechanism 7, the X-axis stroke adjusting mechanism 8 and the Y-axis stroke adjusting mechanism 9, respectively, while rotation of the manipulator 5 through 90° between the terminal positioning device 2 and the housing setter 4 about the $\theta$-axis is controlled by the $\theta$-axis rotational adjusting mechanism 10.

The housing setter 4 includes a housing mounting member 11 having substantially cylindrical shape. The housing mounting member 11 is formed, on its side face, with a mounting surface on which the connector housing 3 is mounted. The housing mounting member 11 is rotatably mounted on a main body 13 through an arm 12 so as to be rotated about the $\beta$-axis. By adjusting amount of rotation of the housing mounting member 11 about the $\beta$-axis, the connector housing 3 mounted on the housing mounting member 11 is set at a position enabling insertion of the terminals of the wired terminals into the connector housing 3. Although not specifically shown, a controller for controlling drive of the terminal positioning device 2, the robot 1 and the housing setter 4 is provided separately.

Figure 3:
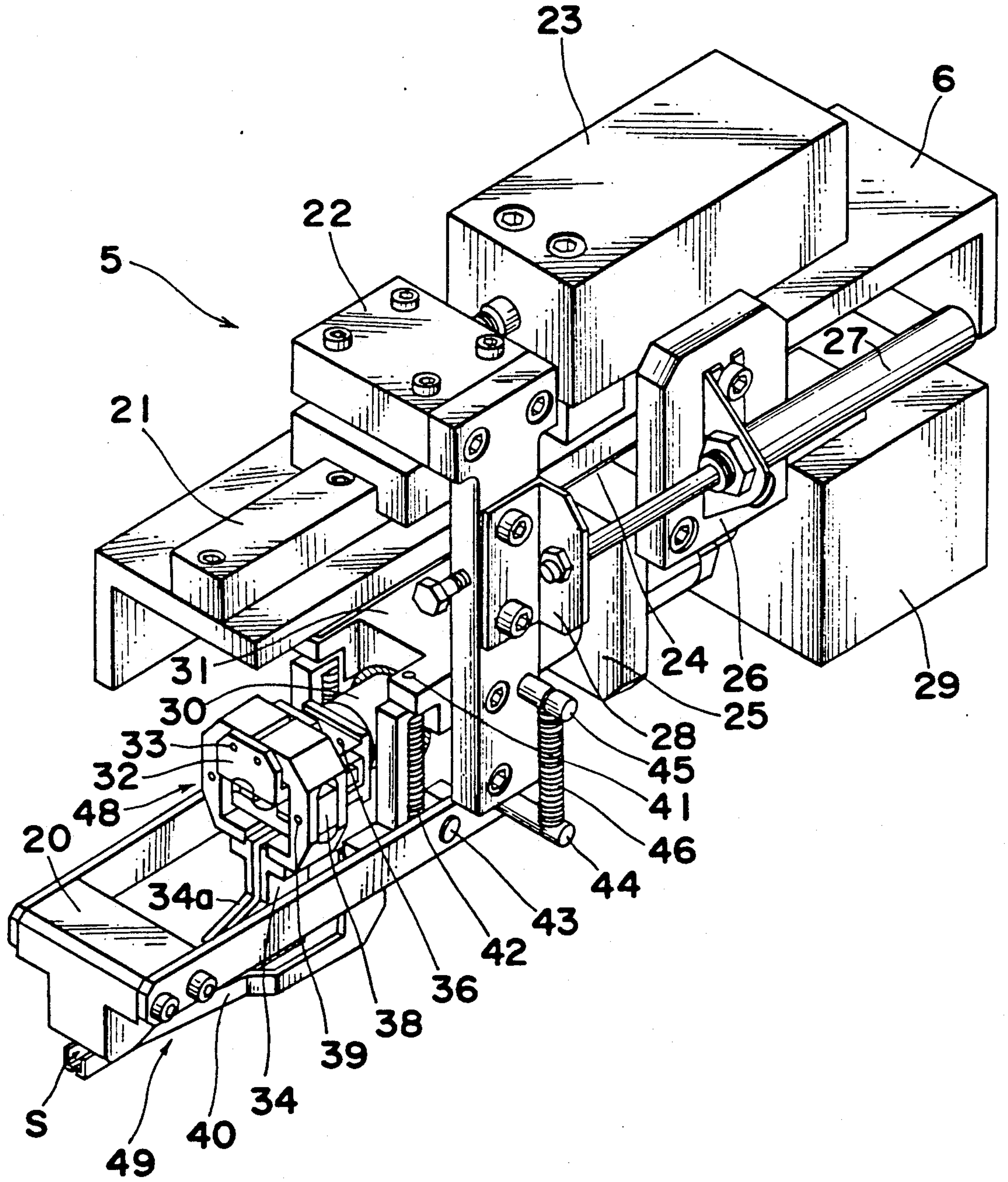
FIG. 3 is a perspective view of a manipulator of a terminal insertion robot employed in the apparatus of FIG. 1.
Figure 4:
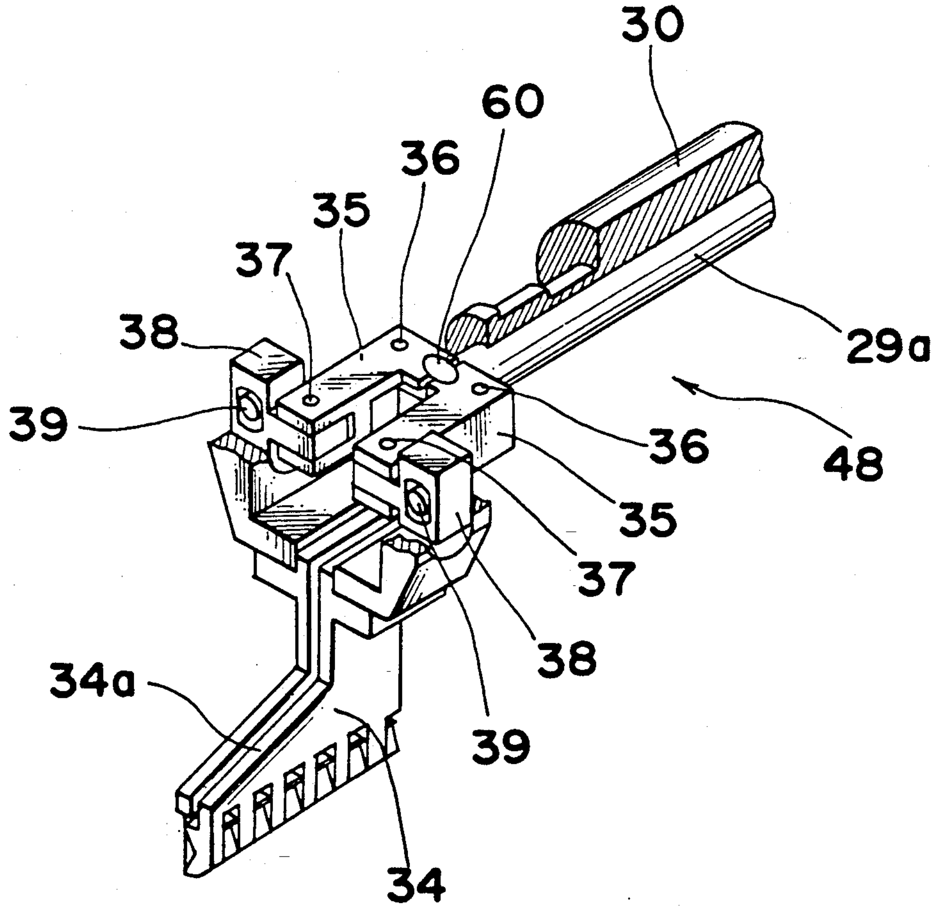
FIG. 4 is a partial perspective view of FIG. 3.
Figure 5:
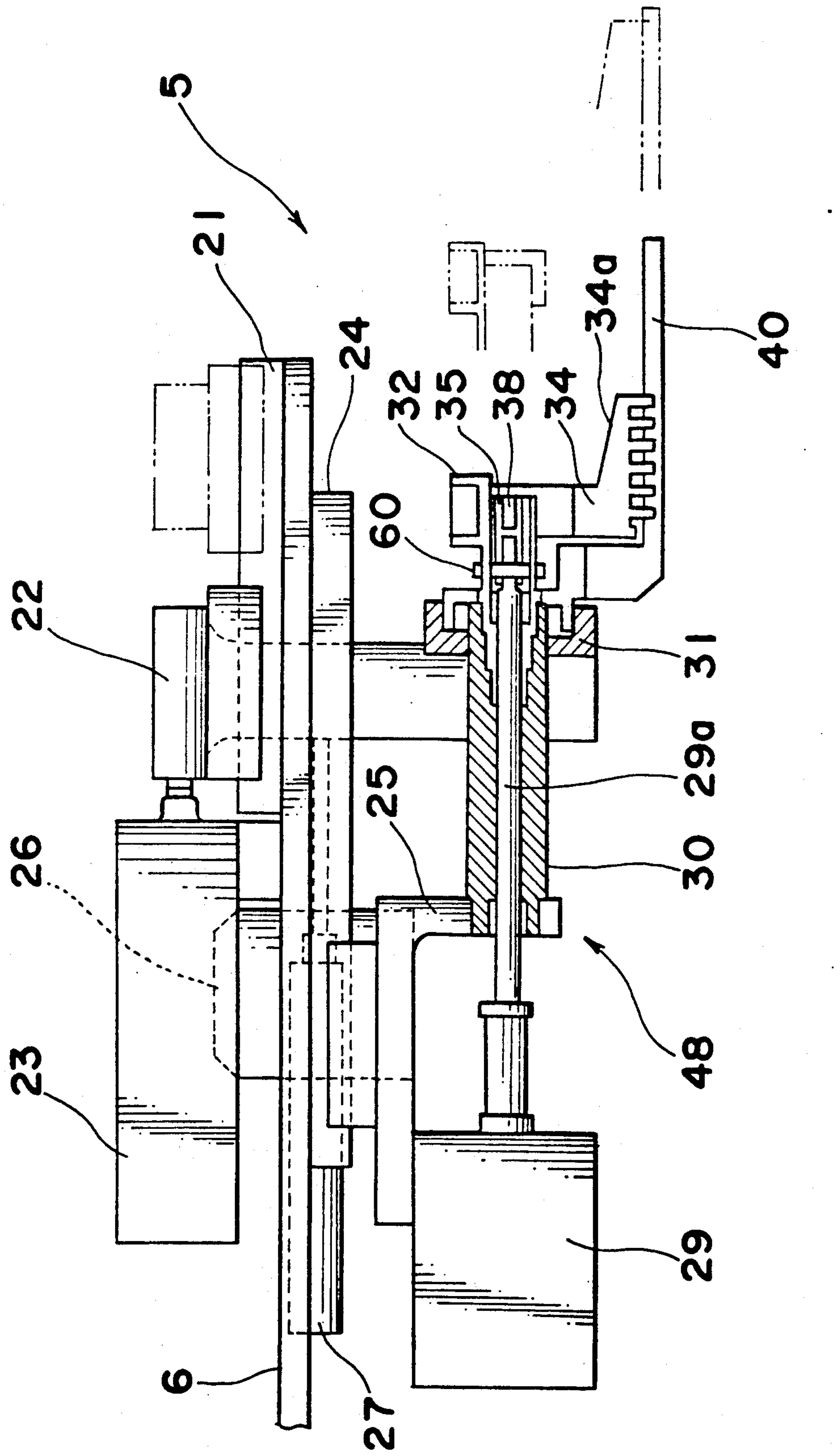
FIG. 5 is a sectional view of FIG. 3.

FIGS. 3 to 5 show the manipulator 5 mounted on the distal end of the robot flange 6 of the robot 1. In FIG. 5, a terminal press arm 20 of FIG. 3 is not shown for convenience of illustration. As shown in FIGS. 3 to 5, a first slider 22 is slidably mounted on a rail 21 secured to the upper face of the robot flange 6 and extending in the longitudinal direction of the robot flange 6. The first slider 22 is slidably driven by a first cylinder 23 mounted, rearwards of the rail 21, on the upper face of the robot flange 6. This first cylinder 23 is so set as to have a stroke of, for example, 50 mm.

On the other hand, a rail 24 extending in the longitudinal direction of the robot flange 6 is attached to the lower face of the robot flange 6. A second slider 25 is slidably mounted on the rail 24. A main body of a second cylinder 27 for inserting the terminal into each of the terminal cavities 3*a* of the connector housing 3 is mounted, through a bracket 26, on the second slider 25. A piston rod of the second cylinder 27 is coupled, via a bracket 28, with the first slider 22. Thus, the second slider 25 is moved towards and away from the first slider 22 in response to retraction and extension of the piston rod of the second cylinder 27.

A main body of a third cylinder 29 for opening and closing a chuck 34 having a pair of chuck pieces is secured to the lower face of the second slider 25. A rear end of a rod support member 30 for slidably supporting a piston rod 29*a* of the third cylinder 29 is fixed to the second slider 25, while a front end of the rod support member 30 is slidably supported by a support member 31 mounted on a lower portion of the first slider 22 so as to be slid in the longitudinal direction of the robot flange 6. A chuck support member 32 for supporting the chuck 34 is secured to the front end of the rod support member 30 and a base end portion of the chuck 34 is attached to the chuck support member 32 by horizontal pins 33 extending in the longitudinal direction of the robot flange 6 such that a pair of the chuck pieces of the chuck 34 are opened or closed in the lateral direction of the robot flange 6.

As shown in FIG. 4, a pair of first links 35 are pivotally mounted, through a vertically extending pin 60, on a distal end of the piston rod 29a of the third cylinder 29. The first links 35 are pivotally supported, through a pair of vertically extending pins 36, by the chuck support member 32. A second link 38 is pivotally supported at a front end portion of each of the first links 35 by each of the first links 35 through a vertically extending pin 37. Each second link 38 is pivotally mounted on the base end portion of the chuck 34 through a horizontal pin 39.

Thus, when the third cylinder 29 is driven such that the piston rod 29a of the third cylinder 29 is extended, the chuck 34 is opened about the horizontal pins 33 in the lateral direction of the robot flange 6 through the first links 35 and the second link 38. On the contrary, when the third cylinder 29 is driven such that the piston rod 29a of the third cylinder 29 is retracted, the chuck 34 is closed about the horizontal pins 33 in the lateral direction of the robot flange 6. In this case, a wire grip means 48 for gripping the electric wire of the wired terminal is constituted by the second slider 25, the second cylinder 27, the third cylinder 29, the rod support member 30, the chuck support member 32, the chuck 34, the first links 35, the second links 38, etc.

On the other hand, a base end portion of each of a pair of guide arms 40 is mounted on the support member 31 through a vertically extending pin 41 such that the guide arms 41 are opened and closed in the lateral direction of the robot flange 6. A coiled spring 42 is wound around the pin 41 so as to urge each of the guide arms 40 in a direction of closing each of the guide arms 40. Meanwhile, a base end portion of the terminal press arm 20 is pivotally mounted on opposite sides of the support member 31 by a pair of horizontal pins 43 such that the terminal press arm 20 is pivoted vertically about the horizontal pins 43. A pin 44 is provided at the base end portion of the terminal press arm 20, while a pin 45 is provided on the first slider 22. A coiled tension spring 46 is hung between the pins 44 and 45 so as to urge the terminal press arm 20 to rotate downwardly. In this case, a terminal grip means 49 for gripping the terminal of the wired terminal is constituted by the support member 31, the terminal press arm 20, the guide arms 40, the coiled springs 42, the coiled tension spring 46, etc.

The chuck 34 is provided between a pair of the guide arms 40 and is reciprocated between a front end and a rear end of the guide arms 40 in response to extension and retraction of the piston rod of the second cylinder 27. When the chuck 34 is displaced to the front end of the guide arms 40 while being closed, the guide arms 40 are slightly thrusted laterally outwardly by the opposite side faces of the chuck 34 and the terminal press arm 20 is slightly raised by an oblique face 34a of the chuck 34. Thus, a state of cancellation of clamp of the terminal is created in which a space S for accommodating each of various terminals is secured between the distal end of the guide arms 40 and the distal end of the terminal press arm 20. In this state, when the chuck 34 is driven by the third cylinder 29 so as to be opened, the guide arms 40 are thrusted by the chuck 34 so as to be further opened, so that a space (not shown) for inserting the electric wire therethrough from below is defined between the guide arms 40.

Meanwhile, when the chuck 34 is displaced to the rear end of the guide arms 40 while being closed, laterally outward thrust of the guide arms 40 by the chuck 34 an raise of the terminal press arm 20 by the chuck 34 are cancelled. As a result, the guide arms 40 are again closed by the urging force of the coiled springs 42 and the terminal press arm 20 is downwardly pivoted to the original position by the urging force of the coiled tension spring 46 and thus, a state of clamp of the terminal is brought about as shown in FIG. 3. Therefore, when the terminal is drawn into the space S at this time, the guide arms 40 and the terminal press arm 20 are pressed against the terminal laterally inwardly and from above, respectively so as to hold the terminal.

Although not specifically shown, a sensor for detecting whether or not the terminal has been properly loaded into the connector housing 3 is provided on the second cylinder 27.

Figure 6:
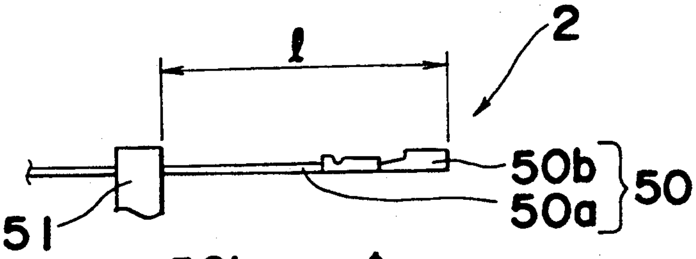
FIGS. 6 to 19 are views explanatory of operations of the apparatus of FIG. 1.

Hereinbelow, operations of the apparatus K are described with reference to FIGS. 6 to 19. Initially, as shown in FIGS. 1 and 2, the connector housing 3 is preliminarily set on the housing mounting member 11 of the housing setter 4 and a start command is given to the controller for controlling the apparatus K. Then, operations of inserting the terminal into the connector housing 3 are performed in the following sequence in accordance with a program stored in a memory of the controller. Namely, in a preceding process (not shown), a wired terminal 50 in which a terminal 50b is connected with an electric wire 50a as shown in FIG. 6 is produced by a known method. Then, the wired terminal 50 is delivered to the terminal positioning device 2.

Figure 7:
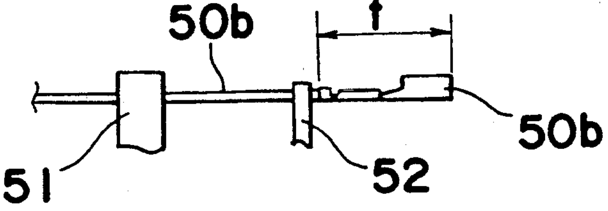
Figure 8:
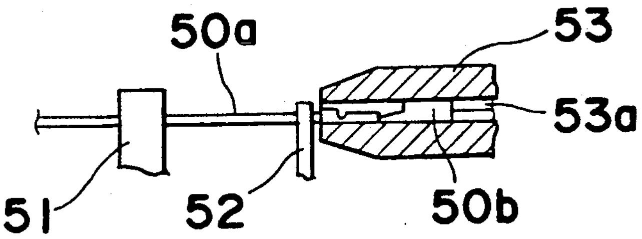
Figure 9:
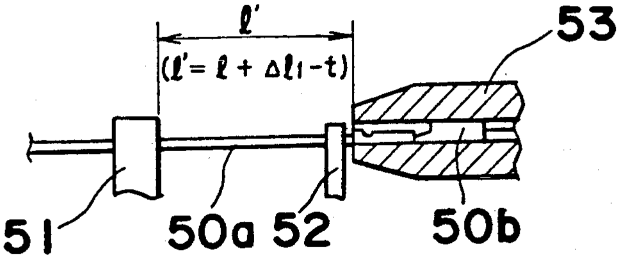

At the terminal positioning device 2, the electric wire 50a of the wired terminal 50 is clamped by a wire clamp 51 at a position of the electric wire 50a spaced a distance l from a distal end of the terminal 50b as shown in FIG. 6. Subsequently, as shown in FIG. 7, a region of the electric wire 50a adjacent to the terminal 50b having a length t is clamped by a centering chuck 52 such that the terminal 50b is disposed in the vicinity of a predetermined position. Thereafter, as shown in FIG. 8, the terminal 50b is vertically gripped between a pair of terminal correcting guides 53 having a guide groove 53a so as to be positioned. Then, as shown in FIG. 9, the clamped terminal correcting guides 53 and the clamped centering chuck 52 are displaced through a distance $\Delta l_1$ rightwards, i.e. in the direction of the Y-axis such that a stroke $l'$ $(=l+\Delta l_1-t)$ for inserting the terminal 50b into the connector housing 3 is adjusted. The distance $\Delta l$ varies according to kinds of the terminal 50b.

Figure 10:
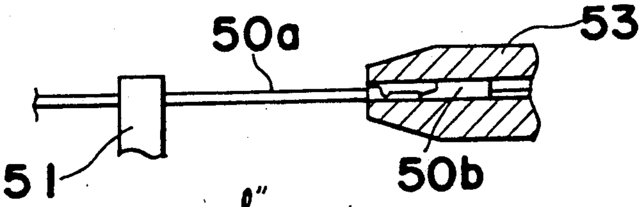
Figure 11:
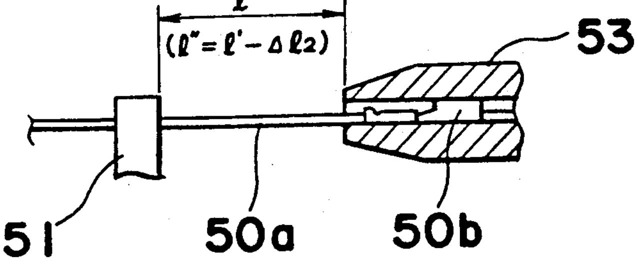

Subsequently, after the centering chuck 52 has been opened and retracted away from the electric wire 50 as shown in FIG. 10, the terminal correcting guides 53 are displaced through a distance $\Delta l_2$ leftwards, i.e. in the direction opposite to the direction of the Y-axis so as to be stopped at a terminal delivery position for delivering the terminal 50b to the robot 1. This is performed for the purpose of stabilizing delivery of the terminal 50b to the robot 1 by minimizing a gap between the manipulator 5 and the terminal correcting guides 53. Thus, the wired terminal 50 is positioned at the predetermined position by the terminal positioning device 2.

Figure 12:
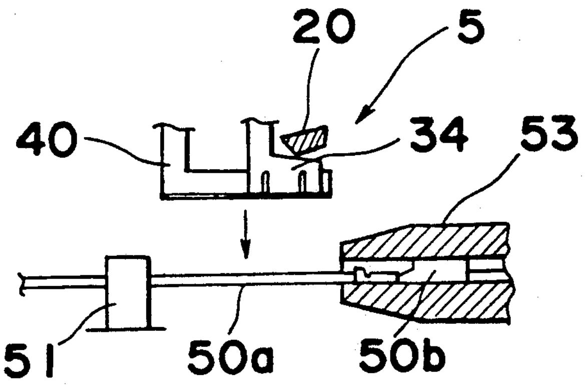

Then, the robot flange 6 of the robot 1 is rotated through 90° in the counterclockwise direction from the position shown in FIG. 1 and the manipulator 5 attached to the distal end of the robot flange 6 is displaced to a position above the wired terminal 50 as shown in FIG. 12. At this time, the components of the manipulator 5 are in the following states. Namely, the first slider 22 is disposed at the retracted position upon retraction of the piston rod of the first cylinder 23, while the chuck 34 is displaced to the front end of the guide arms 40 upon retraction of the piston rod of the second cylinder 27. Accordingly, the terminal press arm 20 is raised by the oblique face 34*a* of the chuck 34. Meanwhile, the chuck 34 is opened upon extension of the piston rod 29*a* of the third cylinder 29. Hence, the guide arms 40 are widely opened laterally by the chuck 34 and thus, the space enabling insertion of the electric wire 50*a* is defined between the guide arms 40.

Figure 13:
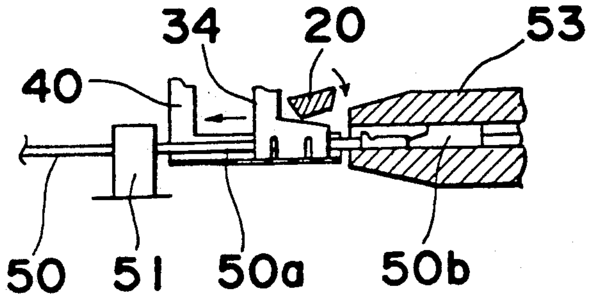

In this state, the robot flange 6 is driven so as to be lowered. At a position where the electric wire 50*a* is interposed between the chuck pieces of the chuck 34 and the guide arms 40 as shown in FIG. 13, descent of the robot flange 6 is stopped. Subsequently, the chuck 34 is closed so as to clamp the electric wire 50*a* at a portion of the electric wire 50*a* adjacent to the terminal 50*b*. At this time, the space S for accommodating the terminal 50*b* is defined between the distal end of the guide arms 40 and the distal end of the terminal press arm 20.

Figure 14A:
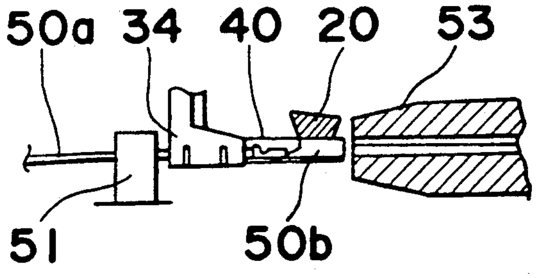
Figure 14B:
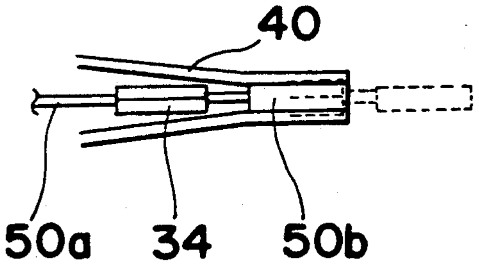

Thereafter, upon cancellation of clamp of the electric wire 50*a* by the wire clamp 51, the chuck 34 is displaced towards the rear end of the guide arms 40 by extension of the piston rod of the second cylinder 27. As a result, the wired terminal 50 is displaced rearwards by the chuck 34 and the terminal 50*b* is drawn into the space S as shown in FIGS. 14*a* and 14*b*. When the terminal 50*b* has been drawn into the space S completely, laterally outward thrust of the guide arms 40 by the chuck 34 and raise of the terminal press arm 20 by the chuck 34 are cancelled. Therefore, the guide arms 40 and the terminal press arm 20 are pressed against the terminal 50*b* laterally inwardly and from above, respectively so as to hold the terminal 50*b*.

Figure 15:
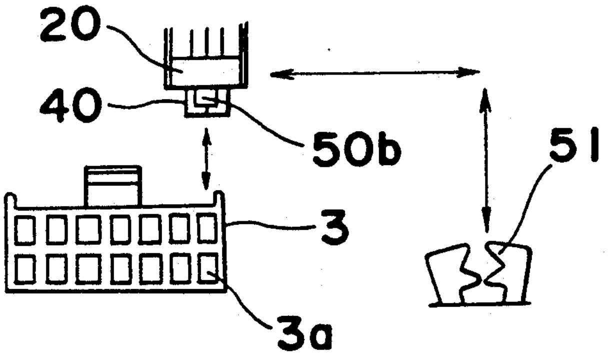

Subsequently, while amounts of travel of the robot flange 6 in the directions of the X-axis, Y-axis and Z-axis are being adjusted by the robot 1, the robot flange 6 is rotated through 90° in the clockwise direction in FIG. 1 such that the manipulator 5 is displaced to a position located in front of the connector housing 3 set on the housing mounting member 11 as shown in FIGS. 2 and 15.

Figure 16:
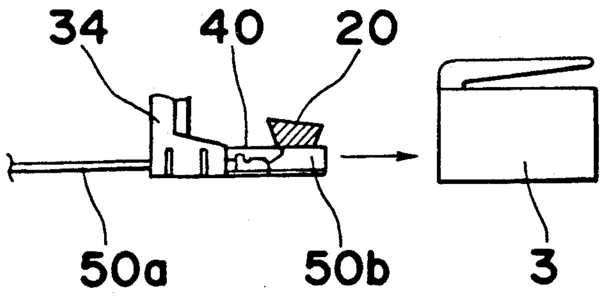

Thereafter, as shown in FIG. 16, the first cylinder 23 is driven such that the piston rod of the first cylinder 23 is extended. Thus, the first slider 22 is displaced forward through 50 mm. As a result, the chuck 34, the guide arms 40 and the terminal press arm 20 are also displaced forward through 50 mm as one unit so as to come close to the connector housing 3.

Figure 17A:
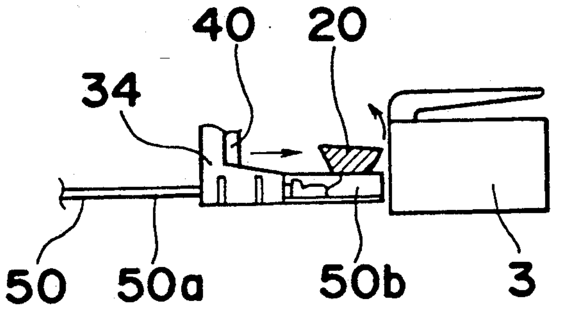
Figure 17B:
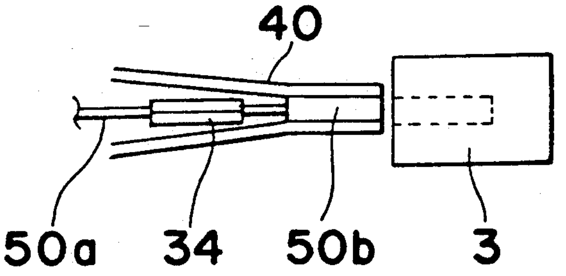

Then, as shown in FIGS. 17*a* and 17*b*, the chuck 34 is displaced to the front end of the guide arms 40 upon retraction of the piston rod of the second cylinder 27. As a result, the wired terminal 50 is displaced forwards and thus, the terminal 50*b* is inserted into one of the terminal cavities 3*a* (FIG. 15) of the connector housing 3 through guide of the guide arms 40 and the terminal press arm 20.

When insertion of the terminal 50*b* into the terminal cavity 3*a* has been completed, the chuck 34 is driven by the second cylinder 27 so as to be retracted and a decision as to whether or not the terminal 50*b* has been properly inserted into the terminal cavity 3*a* is made by the sensor (not shown) provided on the second cylinder 27. Namely, usually when the terminal 50*b* has been accurately inserted into the terminal cavity 3*a* of the connector housing 3, the terminal 50*b* and the connector housing 3 are brought into engagement with each other through a metallic lance provided on the terminal 50*b* or a resinous lance provided on the connector housing 3. As a result, retraction of the chuck 34, in other words, extension of the piston rod of the second cylinder 27 is prevented. Therefore, by detecting by the sensor provided on the second cylinder 27 that extension of the piston rod of the second cylinder 27 is prevented, it becomes possible to ensure that the terminal 50*b* has been accurately inserted into the terminal cavity 3*a*. Meanwhile, when the terminal 50*b* has not been accurately inserted into the terminal cavity 3*a*, the terminal 50*b* is pulled out of the connector housing 3 upon retraction of the chuck 34. In this case, defective insertion of the terminal 50*b* into the terminal cavity 3*a* is detected by the above mentioned sensor, so that operation of the apparatus as a whole is stopped and a warning indicative of defective insertion of the terminal 50*b* into the terminal cavity 3*a* is issued to an operator.

Figure 19:
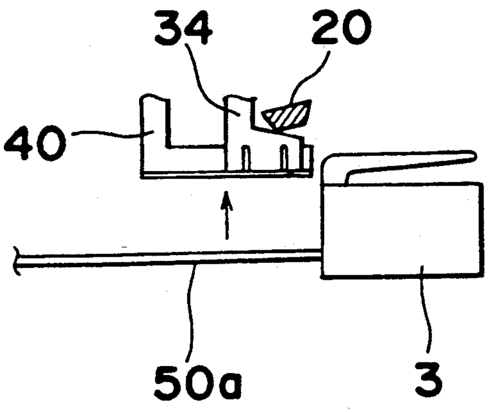

When it is found by the sensor of the second cylinder 27 that the terminal 50*b* has been accurately inserted into the terminal cavity 3*a*, the chuck 34 is driven so as to be opened and the manipulator 5 is moved away from the position for inserting the terminal 50*b* into the terminal cavity 3*a* as shown in FIG. 19.

Subsequently, the above operations are repeated and thus, the various wired terminals 50 are sequentially inserted into the terminal cavities 3*a* of the connector housing 3.

In this embodiment, since the wired terminal 50 is clamped by drawing the terminal 50*b* into the space S between a pair of the guide arms 40 and the terminal press arm 20 by the chuck 34 as shown in FIGS. 13 and 14, the terminal 50*b* is guided by the guide arms 40 and the terminal press arm 20 so as to be accurately stored in the space S and thus, improper positioning of the terminal 50*b* is prevented.

Figure 18:
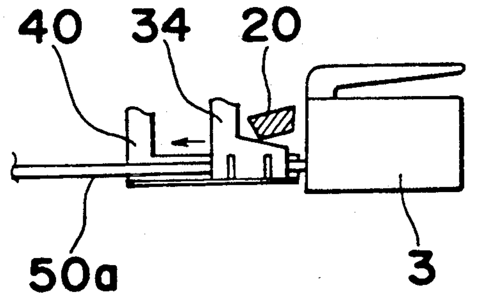

Meanwhile, as shown in FIGS. 17 and 18, since the terminal 50*b* is thrusted into the terminal cavity 3*a* of the connector housing 3 by the chuck 34 while being guided by the guide arms 40 and the terminal press arm 20, in other words, insertion of the terminal 50*b* into the terminal cavity 3*a* is performed through guide of the guide arms 40 and the terminal press arm 20 at all times, the terminal 50*b* is inserted into the terminal cavity 3*a* highly accurately.

Furthermore, as shown in FIGS. 17 and 18, since insertion of the terminal 50*b* into the terminal cavity 3*a* is performed by clamping a portion of the electric wire 50*a* adjacent to the terminal 50*b* by the chuck 34, such an undesirable phenomenon does not take place that an excessive buckling load leading to angular bending of the electric wire 50*a* is applied to the electric wire 50*a* at the time of insertion of the terminal 50*b* into the terminal cavity 3*a*.

Meanwhile, as shown in FIG. 17, the terminal 50*b* can be inserted into the terminal cavity 3*a* by merely displacing the chuck 34 to the front end of the guide arms 40. Therefore, since such a necessity associated with prior art apparatuses is eliminated that a terminal chuck for clamping the terminal 50*b* is retracted away from the terminal 50*b* during insertion of the terminal 50*b* into the terminal cavity 3*a*, the terminal 50*b* can be inserted into the terminal cavity 3*a* rapidly.

As is clear from the foregoing description, the terminal is drawn in between a pair of the guide arms and the terminal press arm so as to be clamped and is thrusted so as to be inserted into the terminal cavity of the connector housing in the method of and the apparatus for inserting the terminals of the wired terminals into the terminal cavities of the connector housing, according to the present invention. Therefore, in accordance with the present invention, such problems are eliminated that the electric wire bends angularly and the electric wire is clamped at an inaccurate position.

Consequently, in accordance with the present invention, the terminals of the wired terminals can be inserted into the terminal cavities of the connector housing rapidly and accurately.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A method of inserting a terminal, connected to an electric wire, into a terminal cavity of a connector housing in said terminal inserting apparatus comprising:

a terminal grip means for gripping said terminal, which includes a pair of guide arms openable and closable in a horizontal plane and a terminal press arm pivotable in a vertical plane such that said guide arms and said terminal press arm are, respectively, pressed against opposite side faces and an upper face of said terminal; and a wire grip means for gripping said electric wire, which includes a chuck retractably advanced along said guide arms between said guide arms;

the method comprising the steps of:

fitting said electric wire of said terminal between said guide arms in a state where said terminal is positioned at a predetermined location and said chuck is opened at a front end of said guide arms;

clamping a portion of said electric wire adjacent to said terminal by said chuck;

retracting said chuck along said guide arms so as to clamp said terminal between said guide arms and said terminal press arm;

displacing said terminal to a position located in front of said terminal cavity of said connector housing in a state where said terminal is clamped by said terminal grip means and said wire grip means; and forwardly displacing said chuck along said guide arms so as to insert said terminal into said terminal cavity of said connector housing by guiding said terminal by said guide arms and said terminal press arm.

2. An apparatus for inserting a terminal, connected to an electric wire into a terminal cavity of a connector housing, comprising:

a terminal grip means for gripping said terminal, which includes a pair of guide arms openable and closable in a horizontal plane and a terminal press arm pivotable in a vertical plane such that said guide arms and said terminal press arm are, respectively, pressed against opposite side faces and an upper face of said terminal by elastic forces;

a wire grip means for gripping said electric wire, which includes a chuck retractably advanced along said guide arms between said guide arms, a first drive member for retractably advancing said chuck and a second drive member for opening and closing said chuck such that a state of grip of said terminal by said terminal grip means is cancelled and established by said chuck at a forward end and a rearward end of a stroke of said chuck, respectively; and a robot flange for supporting said terminal grip means and said wire grip means.

* * * * *